United States Patent
Vukich et al.

(10) Patent No.: US 10,817,912 B2
(45) Date of Patent: Oct. 27, 2020

(54) IDENTIFICATION OF TARGETS FOR A CAMPAIGN BY REFERENCING A BLOCKCHAIN AND/OR A DISTRIBUTED SYSTEM FILE SYSTEM

(71) Applicant: Capital One Services, LLC, McLean, VA (US)

(72) Inventors: Adam Vukich, Alexandria, VA (US); Abdelkadar M'Hamed Benkreira, Washington, DC (US); Joshua Edwards, Philadelphia, PA (US); William Carroll, Huntingtown, MD (US); Mykhaylo Bulgakov, Arlington, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/209,168

(22) Filed: Dec. 4, 2018

(65) Prior Publication Data

US 2020/0175554 A1   Jun. 4, 2020

(51) Int. Cl.
  *G06Q 30/02* (2012.01)
  *H04L 29/06* (2006.01)
  *H04L 9/06* (2006.01)

(52) U.S. Cl.
  CPC ..... *G06Q 30/0276* (2013.01); *G06Q 30/0271* (2013.01); *G06Q 30/0277* (2013.01);
  (Continued)

(58) Field of Classification Search
  CPC .................................................. G06Q 30/0276
  (Continued)

(56) References Cited

U.S. PATENT DOCUMENTS

| | | | |
|---|---|---|---|
| 2016/0253710 A1* | 9/2016 | Publicover | H04W 4/21 705/14.66 |
| 2018/0144153 A1 | 5/2018 | Pead | |

(Continued)

OTHER PUBLICATIONS

Kuno Creative, "6 Ways to Benefit from Blockchain Marketing Technology", https://www.kunocreative.com/blog/blockchain-marketing, May 22, 2018, 13 pgs.

*Primary Examiner* — Azam A Ansari
(74) *Attorney, Agent, or Firm* — Harrity & Harrity, LLP

(57) ABSTRACT

A device, that is part of a network of nodes that has access to a blockchain, may receive, from a user device associated with an entity, a request for campaign information for a campaign. The request may include data identifying campaign parameters. The device may interact with smart contracts associated with the blockchain to identify individuals to target for the campaign. The smart contracts may be configured to receive the campaign parameters as input and to output an indication of whether campaign preferences are compatible with the campaign parameters. The device may generate the campaign information to include information identifying the individuals targeted for the campaign and information identifying particular campaign preferences found to be compatible with particular campaign parameters. The device may provide the campaign information to the user device to permit the user device to use the campaign information to target the individuals for the campaign.

20 Claims, 8 Drawing Sheets

(52) U.S. Cl.
CPC ........ *H04L 9/0643* (2013.01); *H04L 63/0414*
(2013.01); *H04L 2209/38* (2013.01)

(58) Field of Classification Search
USPC ...................................................... 705/14.72
See application file for complete search history.

(56) References Cited

U.S. PATENT DOCUMENTS

2019/0012249 A1* 1/2019 Mercuri ................. G06Q 20/02
2019/0164153 A1* 5/2019 Agrawal ............... H04L 9/3218

\* cited by examiner

IDENTIFICATION OF TARGETS FOR A CAMPAIGN BY REFERENCING A BLOCKCHAIN AND/OR A DISTRIBUTED SYSTEM FILE SYSTEM

BACKGROUND

A blockchain is a distributed database that maintains a continuously-growing list of records, called blocks, that may be linked together to form a chain. Each block in the blockchain may contain a timestamp and a link to a previous block and/or transaction. The blocks may be secured from tampering and revision. In addition, a blockchain may include a secure transaction ledger database shared by parties participating in an established, distributed network of computers. A blockchain may record a transaction (e.g., an exchange or transfer of information) that occurs in the network, thereby reducing or eliminating the need for trusted/centralized third parties. In some cases, the parties participating in a transaction may not know the identities of any other parties participating in the transaction but may securely exchange information. Further, the distributed ledger may correspond to a record of consensus with a cryptographic audit trail that is maintained and validated by a set of independent computers.

SUMMARY

According to some possible implementations, a method may include receiving, by a device, campaign preferences data identifying campaign preferences of a group of individuals. The method may include generating, by the device and based on receiving the campaign preferences data, a set of smart contracts for the group of individuals. The set of smart contracts may include a group of identifiers for the group of individuals and the campaign preferences data of the group of individuals. The method may include providing, by the device, the set of smart contracts to be stored using a distributed ledger that is accessible to a network of nodes. The method may include receiving, by the device and from a user device associated with an entity, a request for campaign information that is to be used for a campaign. The request may include data identifying one or more campaign parameters. The method may include identifying, by the device and by interacting with the set of smart contracts associated with the distributed ledger, one or more individuals to target for the campaign. The one or more individuals may be identified based on a comparison of the campaign preferences and the one or more campaign parameters. The method may include generating, by the device, the campaign information for the campaign. The campaign information may include information identifying the one or more individuals targeted for the campaign or information identifying particular campaign preferences that were found to be compatible with the one or more campaign parameters. The method may include providing, by the device and to the user device, the campaign information to permit the user device to use the campaign information for the campaign.

According to some possible implementations, a first node may include one or more memories, and one or more processors, operatively coupled to the one or more memories, to: receive, from a user device associated with an entity, a request for campaign information that is to be used for a campaign. The request may include data identifying one or more campaign parameters. The first node may be part of a network of nodes that has access to a distributed ledger. The one or more processors may identify, by interacting with one or more smart contracts associated with the distributed ledger, one or more individuals to target for the campaign. The one or more smart contracts may include a set of encrypted identifiers for a group of individuals that include the one or more individuals, and campaign preferences data identifying campaign preferences of the group of individuals. The one or more individuals may be identified based on a comparison of the campaign preferences and the one or more campaign parameters. The one or more processors may obtain personal information of the one or more individuals by using one or more encrypted identifiers associated with the one or more individuals to reference a distributed file system that is accessible to the network of nodes and that associates the one or more encrypted identifiers with the personal information. The one or more processors may generate the campaign information for the campaign. The campaign information may include information identifying the one or more individuals targeted for the campaign (e.g., including the personal information of the one or more individuals) or information identifying particular campaign preferences that were found to be compatible with the one or more campaign parameters. The one or more processors may provide the campaign information to the user device to permit the user device to use the campaign information to target the one or more individuals for the campaign.

According to some possible implementations, a non-transitory computer-readable medium may store instructions that include one or more instructions that, when executed by one or more processors of a device, cause the one or more processors to: receive, from a user device associated with an entity, a request for campaign information that is to be used for a campaign. The request may include data identifying one or more campaign parameters. The device may be part of a network of nodes that has access to a blockchain. The one or more instructions may cause the one or more processors to identify, by interacting with one or more smart contracts associated with the blockchain, one or more individuals to target for the campaign. The one or more smart contracts may be configured to receive the one or more campaign parameters as input and to output an indication of whether campaign preferences are compatible with the one or more campaign parameters. The one or more individuals may have a threshold number of the campaign preferences that are compatible with the one or more campaign parameters. The one or more instructions may cause the one or more processors to generate the campaign information for the campaign. The campaign information may include information identifying the one or more individuals targeted for the campaign and information identifying particular campaign preferences that were found to be compatible with the one or more campaign parameters. The one or more instructions may cause the one or more processors to provide the campaign information to the user device to permit the user device to use the campaign information to target the one or more individuals for the campaign.

DETAILED DESCRIPTION

Figure 1A:
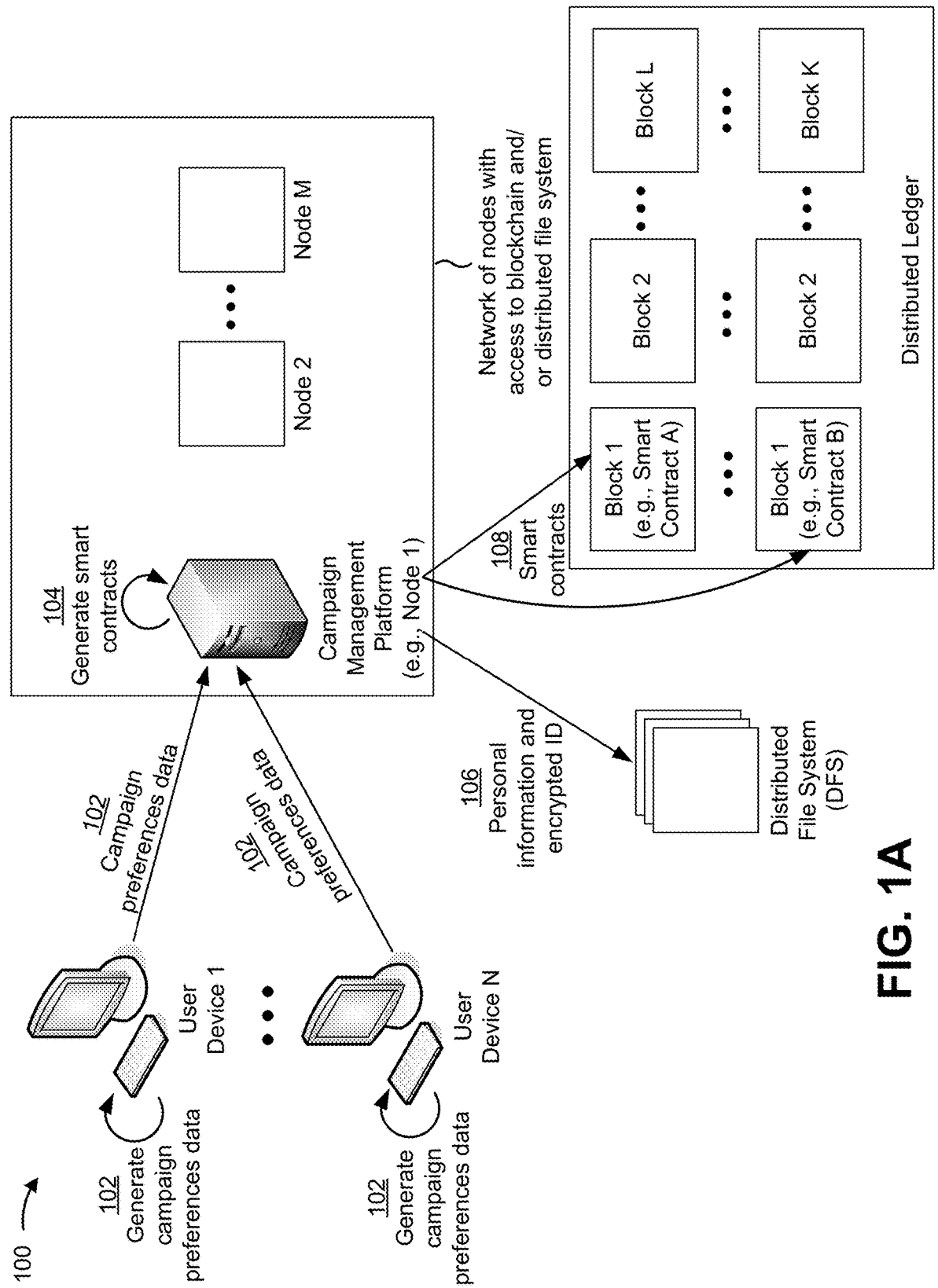
FIGS. 1A-1C are diagrams of an example implementation described herein.

The following detailed description of example implementations refers to the accompanying drawings. The same reference numbers in different drawings may identify the same or similar elements.

Personal information (e.g., personally identifiable information (PII), sensitive personal information (SPI), etc.) is information that may be used to identify, contact, and/or locate a single person. An organization may store personal information for customers, employees, and/or the like. Additionally, the organization may require that employees participate in some form of education regarding data privacy and protection of personal information. For example, the organization may require that employees take a computer-based training (CBT) program to inform the employees about data privacy laws, review situations where sharing personal information of customers is appropriate, review situations where sharing the personal information of the customers is inappropriate, and/or the like.

However, extensive data privacy laws and regulations, which may be easy to misinterpret, may make the CBT or related programs an ineffective way for the organization to ensure that employees are handling personal information of customers in a manner that is compliant under the law. For example, for an employee to make an informed decision when dealing with personal information of a customer, the employee, who often does not possess a legal background, may have to understand when personal information of a customer may be shared, with whom the personal information may be shared (e.g., an affiliate of the organization, a subsidiary of the organization, a third-party, and/or the like), a manner in which the personal information may be shared (e.g., electronic mail, text messaging, phone call, etc.), and/or the like. Additionally, data privacy laws and regulations are frequently evolving, further complicating attempts by the organization to educate employees on how to handle personal information of customers in a manner that is compliant under the law.

As a specific example, an employee of the organization (e.g., a campaign manager) may be tasked with deploying a campaign that involves sending a campaign offer to one or more individuals that are customers of the organization. To successfully send the campaign offer, the employee may need to identify which individuals are permitted to be targeted for the campaign and may need to obtain the personal information of the individuals that have been identified. However, individuals may have presented the organization with specific preferences that restrict what types of customer data may be shared, entities with which the customer data may be shared, and/or the like. Additionally, after identifying the individuals as targets for the campaign, the employee may need to understand data privacy laws and regulations to determine whether there may be any other restrictions influencing a manner in which the campaign may be implemented.

Some implementations described herein provide a network of nodes that have access to a distributed ledger and/or a distributed file system used to manage campaign preferences for a group of individuals, and provide a first node (e.g., a campaign management platform) to reference and process the campaign preferences to generate campaign information identifying one or more individuals to target for a campaign. For example, the campaign management platform may receive, from a second node, a request for the campaign information for the campaign. The request may include data identifying campaign parameters, such as a campaign parameter indicating a subject of the campaign, a campaign parameter indicating a specific campaign offer being made during the campaign, a campaign parameter indicating a mode of communication that is to be used for the campaign, a campaign parameter indicating a duration of the campaign, and/or the like. In this case, the campaign management platform may identify the one or more individuals to target for the campaign by interacting with a set of smart contracts associated with the distributed ledger. For example, the set of smart contracts may receive the campaign parameters as input and may output an indication of whether the campaign preferences of the individuals associated with the smart contracts are compatible with the campaign parameters.

Additionally, the campaign management platform may generate the campaign information for the campaign. For example, the campaign management platform may generate the campaign information to include information identifying the one or more individuals targeted for the campaign and/or information identifying particular campaign preferences of the one or more individuals that were found to be compatible with the campaign parameters. Furthermore, the campaign management platform may provide the campaign information to the user device to permit the user device to use the campaign information to target the one or more individuals for the campaign.

In this way, the campaign management platform is able to use the campaign preferences for each individual or a group of individuals to generate the campaign information for the campaign. Furthermore, using the distributed ledger allows the campaign management platform to facilitate the distribution of the campaign preferences and/or the campaign information in a manner that is flexible, secure, distributed, and automated. For example, flexibility is provided by enabling execution of various smart contracts that include specific preferences of individuals regarding whether personal information may be shared, when the personal information may be shared, a mode of communication that may be used when sharing the personal information, and/or the like.

Additionally, security is provided by supporting the distributed ledger with a tamper-resistant data structure (e.g., a blockchain), by implementing one or more forms of encryption, by restricting access to the distributed ledger to particular parties, and/or the like. For example, the distributed ledger may improve security by preserving an immutable record of an individual's campaign preferences, by using cryptographic links between blocks of the distributed ledger (e.g., reducing the potential for unauthorized tampering with campaign preferences data), and/or the like. Security is further improved as a result of devices that have access to the distributed ledger independently verifying each transaction that is added to the distributed ledger. Moreover, use of the distributed ledger also provides failover protection, in that the campaign management platform may fail, and another node in the network may take on responsibilities of the campaign management platform.

Furthermore, several different stages of the process for managing campaign preferences of individuals are automated, which may remove human subjectivity and waste from the process, and which may improve speed and efficiency of the process and conserve computing resources (e.g., processor resources, memory resources, and/or the like). For example, by using the distributed ledger to identify individuals as targets for the campaign, the campaign management platform eliminates a need for a human to identify the individuals, which might otherwise require knowledge regarding data privacy and protection of personal information of individuals. Additionally, implementations described herein use a rigorous, computerized process to perform tasks or roles that were not previously performed or were previously performed using subjective human intuition or input.

Figure 1B:
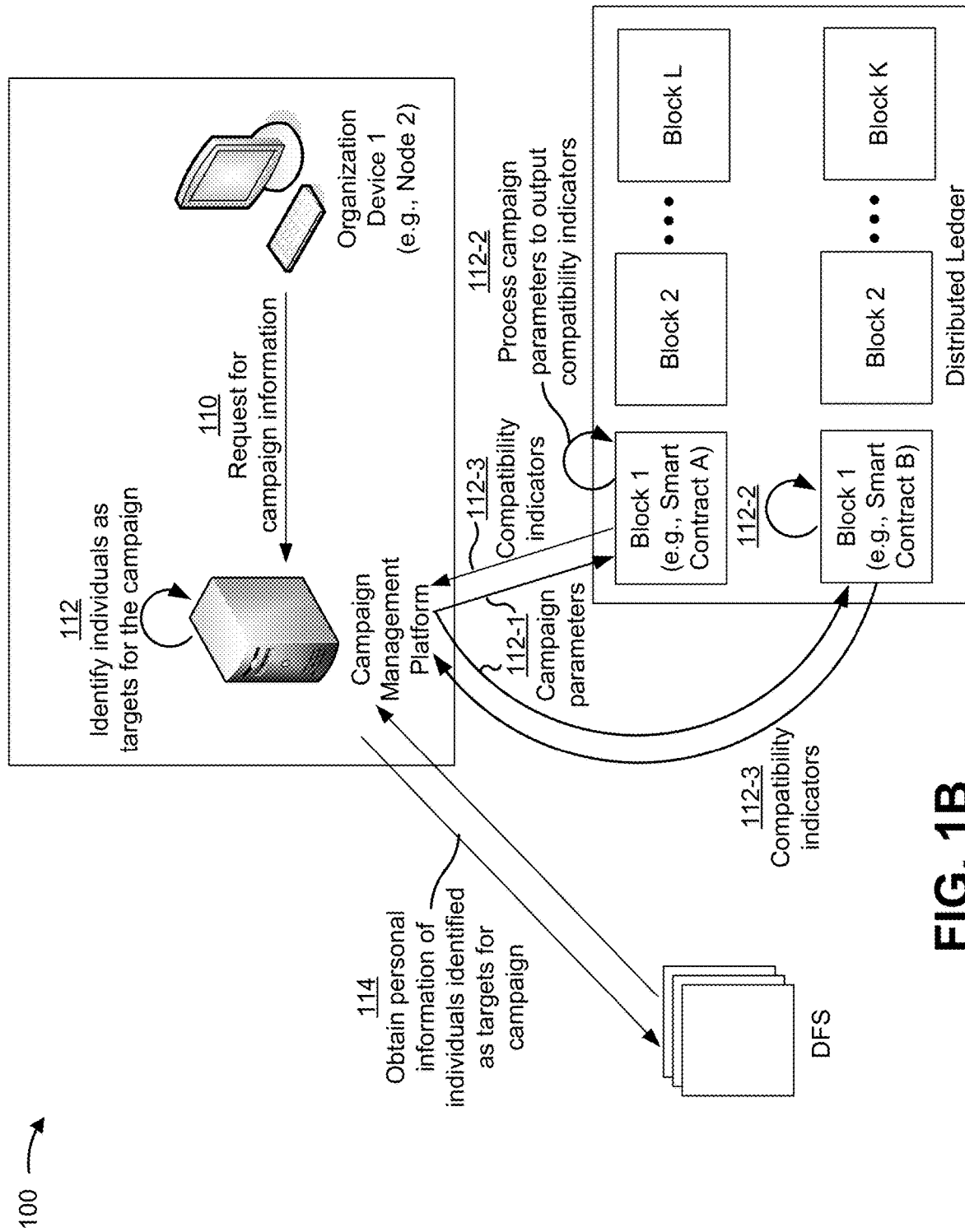
Figure 1C:
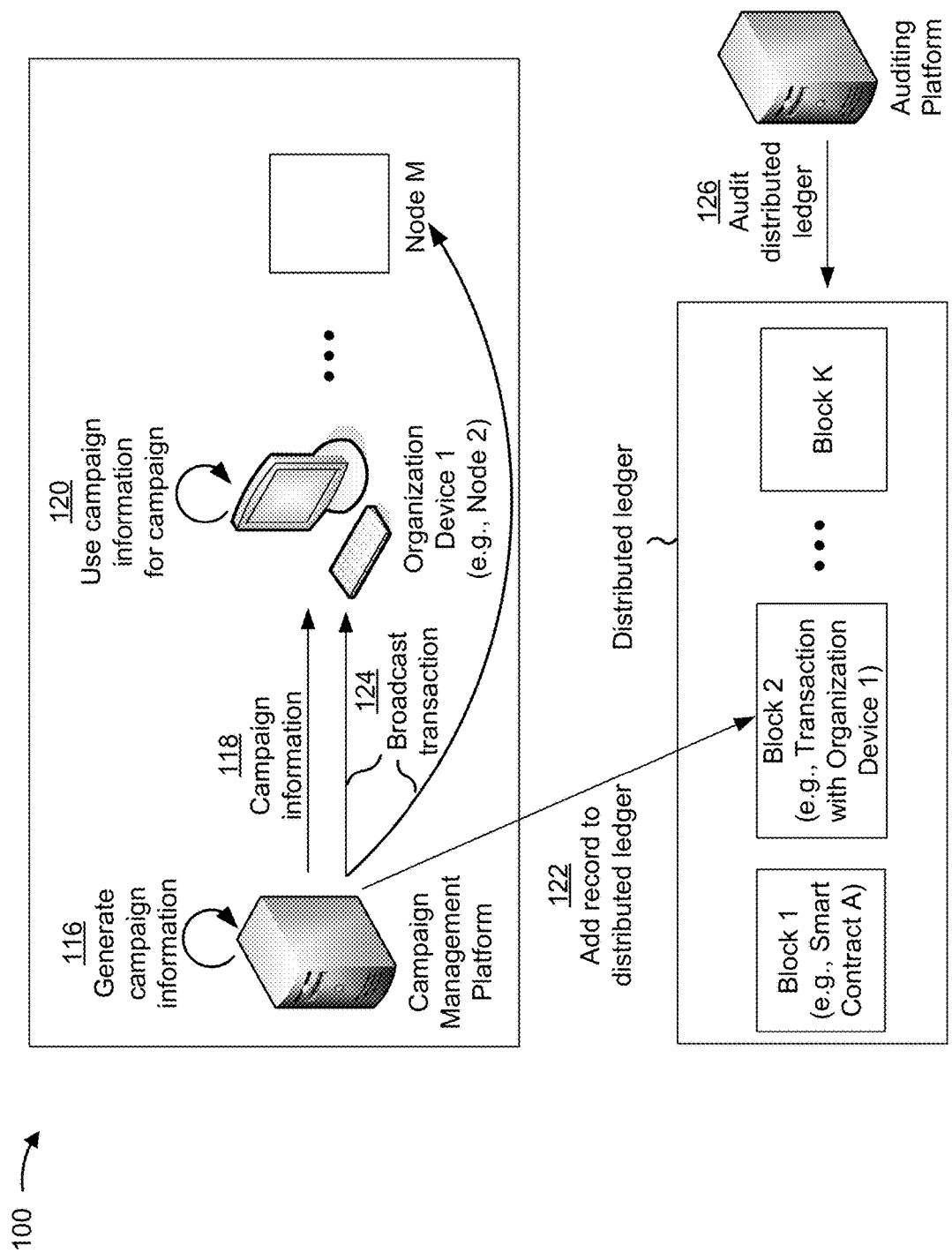

FIGS. 1A-1C are diagrams of an example implementation 100 described herein. For example, example implementation 100 may include a group of user devices (shown as User Device 1 through User Device N), a network of nodes (shown as a campaign management platform serving as Node 1, Node 2, . . . , Node M), a device associated with an organization (shown as Organization Device 1), a distributed file system, a distributed ledger (e.g., supported by a data structure, such as a blockchain), and an auditing platform.

Some embodiments described herein may refer to receiving, processing, generating, and/or providing personal information of individuals. It should be understood that any use of the personal information may be subject to consent of the individuals and will be used in a manner that is compliant with applicable laws concerning protection and/or use of personal information. As an example, consent of an individual may be obtained via a survey or prompt where the individual is asked to input campaign preferences or to otherwise agree or reject certain preferences. Furthermore, any use and/or transmission of the personal information may be secured via one or more encryption techniques or techniques to anonymize the personal information.

As shown in FIG. 1A, and by reference number 102, the group of user devices may generate and provide campaign preferences data to the campaign management platform. For example, a group of individuals may interact with the group of user devices to input campaign preferences that may dictate whether a campaign provided by or sponsored by the organization may target the group of individuals, a manner in which the group of individuals may be targeted for the campaign, and/or the like. In this case, the group of individuals may be customers of an organization and may use the organization for one or more banking services, such as a service that provides an individual with a checking account, a savings account, a credit account, one or more types of transactions cards (e.g., a debit card, a credit card, a rewards card, etc.), and/or the like. In some cases, the organization may ask the group of individuals to provide campaign preferences which indicate whether the campaign may target an individual, a manner in which the individual may be targeted, and/or the like.

A campaign, as used herein, may refer to one or more offers or events provided by or sponsored by the organization, that involve advertising, marketing, and/or selling a product or a service to one or more individuals that are customers of the organization. Additionally, or alternatively, the campaign may include one or more messages or notifications associated with a product or a service (e.g., a message associated with an existing product, a message unrelated to marketing and/or selling, such as an announcement regarding a change to a term of a product or a service, etc.).

The campaign preferences may include a first campaign preference indicating whether an individual consents to be targeted for a campaign (e.g., which may require sharing personal information of the individual with a particular entity, such as a third-party organization, a particular subsidiary within the organization, and/or the like), a second campaign preference indicating a mode of communication by which the individual agrees to receive offers that are part of the campaign (e.g., via an electronic mailing address, via a short message service (SMS), via a telephone call, and/or the like), a third campaign preference indicating a time period or group of time periods during which the individual agrees to receive offers that are part of the campaign, a fourth campaign preference indicating what type of content permitted to be shared, and/or the like. In some implementations, a campaign preference may be a global campaign preference or may be applied to a specific product, to a specific time period, via a specific mode of communication, and/or the like.

In some implementations, the group of individuals may use the group of user devices to complete a survey that includes questions that ask for the campaign preferences or prompts for selecting and/or approving/denying preferences. When the responses to the questions or prompts are submitted, campaign preferences data may be provided to the campaign management platform. In this case, the survey may be completed by responding to questions displayed via a website, via an application (e.g., a mobile application), via a text editor (e.g., a word document), and/or the like. Additionally, or alternatively, the group of individuals may input campaign preferences in another manner, such as by calling the organization and providing oral responses, by including campaign preferences in a hand-written letter and mailing the letter to the organization, and/or the like.

In some implementations, the group of individuals may periodically update the campaign preferences. For example, an individual may update the campaign preferences if one of the individual's campaign preferences has changed. Additionally, or alternatively, the organization may periodically ask the individual to update the campaign preferences (e.g., once a month, once a year, at a time when the individual purchases a new product or service from the organization, and/or the like).

In some implementations, an individual may have an opportunity to input campaign preferences for a particular product offered by the organization. For example, if the individual is granted a new transaction card (e.g., a new credit card), the individual may input campaign preferences that are specific to the new transaction card.

As shown by reference number 104, the campaign management platform may generate a set of smart contracts. For example, the campaign management platform may generate a smart contract for an individual, may generate a smart contract for a group of individuals, may generate a smart contract for a particular classification of individuals, may generate a smart contract for a particular product associated with an individual, and/or the like.

In some implementations, the campaign management platform may generate a smart contract that may be used for an individual. A smart contract, as used herein, may refer to a computer protocol that includes one or more functions that allow the smart contract to digitally facilitate, verify, and/or assist with a transaction, an agreement, a scenario where campaign parameters of a campaign are to be verified to determine whether they are compatible with campaign preferences of the individual, and/or the like. In this case, the campaign management platform may generate a smart contract that includes an identifier of the individual (e.g., a name, a username, contact information of the individual, an address of the information, and/or the like), campaign preferences data identifying campaign preferences of the individual, and/or the one or more functions described above. As an example, the one or more functions of the smart contract may be configured to receive campaign parameters as inputs. The smart contract may compare the campaign parameters of a campaign and configurable campaign preferences of a user, which may be stored as part of the smart contract or accessible via a function of the smart contract (e.g., the function may reference a data structure, such as a data structure that is a block in the blockchain). This may cause the smart contract to output values (e.g., true or false values) based on whether the campaign parameters satisfy (e.g., match with) the campaign preferences. This may allow the campaign management platform to determine whether the individual may be targeted for a campaign, how the individual may be targeted, when the individual may be targeted, and/or the like.

Additionally, or alternatively, the campaign management platform may generate a smart contract that may be used for a group of individuals (e.g., such that each individual in the group uses a smart contract with the same terms), for a particular classification of individuals, for a particular product associated with an individual, and/or the like. For example, the campaign management platform may generate a first smart contract for a first account of an individual (e.g., a checking account, a savings account, etc.) and may generate a second smart contract for a second account of the individual (e.g., an account linked to a credit card of the individual). As another example, the campaign management platform may generate a first smart contract for a first product and a second smart contract for a second product, such that individuals with each respective product may utilize each respective smart contract. In this way, the campaign management platform is able to generate smart contracts that are tailored specifically to individuals, to groups of individuals, to products associated with individuals, and/or the like.

In some implementations, the campaign management platform may remove personal information of the individual from the smart contract. For example, assume the identifier of the individual is the individual's name or another type of personal information (e.g., an address, a phone number, etc.). In this case, the campaign management platform may process the identifier (e.g., using a hash function) to generate a cryptographic hash value that serves as an encrypted identifier of the individual. The encrypted identifier may be stored using the smart contract (e.g., in place of the identifier).

In some implementations, as shown in FIG. 1A, the personal information of the individual may be stored using the distributed file system. The distributed file system may be supported by the network of nodes. For example, the blockchain may be unable to support large quantities of information (or may be unable to efficiently handle queries if too much information is stored on the blockchain). In this case, the distributed file system may be used to handle storage for the personal information of the group of individuals, and may store the personal information using one or more data structures, such as a tree (e.g., a binary search tree (BST), a red-black (RB) tree, a B-tree, etc.), a graph, a distributed database, a hash table, a linked list, and/or the like.

In some implementations, the blockchain may store encrypted identifiers (e.g., hashed addresses) for particular personal information, where the encrypted identifiers serve as pointers to memory locations at which the particular personal information is stored within the distributed file system. In this case, the campaign management platform may use a content addressing technique to process the identifier of the individual, which may generate a cryptographic hash value that serves as an encrypted identifier. The cryptographic hash value may identify a storage location at which the personal information of the individual (e.g., the individual's name) is to be stored within the distributed file system.

In some implementations, the campaign management platform may utilize one or more rules to improve security and/or integrity of data stored via the distributed file system. For example, the campaign management platform may, as a master node or management node, have read access and write access to the distributed file system, but may be the only node with write access to the distributed file system (e.g., the other nodes may be limited to read-only access). As another example, the campaign management platform may re-create data stored via the distributed file system after a threshold time period (e.g., every hour, every day, etc.). As such, any fraudulent attempts to infiltrate the distributed file system may be overwritten while re-creating the data.

As shown by reference number 106, the campaign management platform may provide the personal information of the individual to be stored by the distribute file system. For example, the campaign management platform may provide the personal information to be stored at a storage location that is identifiable using the cryptographic hash value.

As shown by reference number 108, the campaign management platform may provide the set of smart contracts to the distributed ledger. As shown as an example, if the distributed ledger uses a blockchain, the campaign management platform may provide the set of smart contracts to be stored as part of the blockchain. Over time, additional records may be added as new blocks of the blockchain, such as a record indicating that an individual has updated a campaign preference, a record of a transaction between the campaign management platform and another node (e.g., a request for campaign preferences for a campaign, a result of the request, etc.), a block indicating whether the request was granted, and/or the like. Additionally, or alternatively, if the smart contract is stored via the blockchain, then an updated smart contract may be added to the blockchain.

In some implementations, the campaign management platform may validate the set of smart contracts. For example, the campaign management platform may provide the set of smart contracts to one or more devices associated with validation entities. In this case, the one or more validation entities may be used to independently validate and/or verify whether the smart contract is in compliance with rules or protocols used within the distributed ledger.

In this way, the campaign management node generates and provides the set of smart contracts to the distributed ledger.

As shown in FIG. 1B, and by reference number 110, the device associated with the organization may provide, to the campaign management platform, a request for campaign information that is to be used for a campaign. For example, an employee of the organization (e.g., a campaign manager) may interact with an interface (e.g., a web interface, an application interface, etc.) to create a request for campaign information for a campaign. In this case, the employee may input campaign parameters for the campaign, which may cause the device associated with the organization to create and provide the campaign management platform with the request.

The request may include a campaign identifier to identify the campaign, data identifying an entity running the campaign, data identifying campaign parameters, such as a first campaign parameter indicating a subject of the campaign (e.g., a campaign to advertise a new type of transaction card might list the new type of transaction card as the subject), a second campaign parameter indicating a specific campaign offer being made during the campaign, a third campaign parameter indicating a mode of communication that is to be used for the campaign (e.g., the campaign may have to provide the campaign offer to individuals via a particular mode of communication), a fourth campaign parameter indicating a duration of the campaign, and/or the like.

As shown by reference number 112, the campaign management platform may identify one or more individuals as targets for the campaign. For example, and as shown by reference number 112-1, the campaign management platform may provide the campaign parameters to the set of smart contracts. As shown by reference number 112-2, this may cause the set of smart contracts to process the campaign parameters to output one or more compatibility indicators. For example, the campaign parameters may be provided as input to a smart contract, which may cause the smart contract to compare the campaign parameters to campaign preferences of a user. If a campaign parameter matches or satisfies a threshold level of similarity with a campaign preference, a compatibility indicator or flag may update (e.g., from a null value to a value of true or false, depending on whether the match was successful). This may cause the smart contract to output the one or more compatibility indicators. In some cases, the smart contract may output an encrypted identifier of an individual that may be used to search the distributed file system for personal information of the individual, as described further herein. The encrypted identifier, for example, may correspond to a particular campaign preference, a particular campaign parameter, and/or the like.

As an example, assume the campaign has a first campaign parameter indicating that an individual has a first campaign preference indicating that campaign offers may be provided to the individual via the organization and subsidiaries of the organization but not via third-party organizations and has a second campaign preference indicating that the individual may receive campaign offers via electronic mail (e-mail) but not via an SMS message or telephone. Further assume that a first campaign parameter indicates that a subsidiary of the organization will provide a campaign offer of a discounted product and that a second campaign parameter indicates that the campaign offer will be provided to individuals via an SMS message. In this example, the smart contract may process the campaign parameters and may output a first compatibility value indicating that the first campaign preference is compatible with the first campaign parameter and may output a second compatibility value indicating that the second campaign preference is not compatible with the second campaign parameter. In some implementations, a single compatibility value may be output indicating full compatibility or that at least one preference is not compatible.

As shown by reference number 112-3, the set of smart contracts may be configured to provide the compatibility indicators to the campaign management platform. For example, the set of smart contracts may provide the compatibility indicators to the campaign management platform using a communication interface, such as an application programming interface (API). In some implementations, rather than provide the campaign management platform with the compatibility indicators, the set of smart contracts may create a record that includes the compatibility indicators and may add the record to the distributed ledger (e.g., as another block in the blockchain). As such, the campaign management platform may obtain the compatibility indicators by searching the blockchain to identify the record.

In some implementations, the campaign management platform may determine whether to identify an individual as a target for the campaign using a rule. For example, the campaign management platform may be configured with a rule, such as a first rule indicating that a threshold number of campaign preferences of the individual are compatible with the campaign parameters, a second rule indicating that a particular campaign preference has to be compatible with a campaign parameter for the individual to be a target for the campaign, a third rule indicating that the particular campaign preference is to be assigned a weighted value that is greater than or less than weighted values that are assigned to other campaign preferences, and/or the like. In some implementations, the smart contract may be configured with a rule that allows the smart contract to determine whether the individual is permitted to be a target for the campaign.

In some implementations, and as shown by reference number 114, the campaign management platform may obtain personal information of the individuals identified as targets for the campaign. For example, if the distributed file system is used to store the personal information of the group of individuals, the set of smart contracts may store only an encrypted identifier of the one or more individuals. In this case, the campaign management platform may use the encrypted identifier that were found in the smart contracts to search the distributed file system to obtain the personal information of the one or more individuals that are to be targeted for the campaign. As described elsewhere herein, the encrypted identifiers may identify storage locations within the distributed file system, which may allow the campaign management platform to obtain the personal information of the individuals. Personal information, as used herein, may refer to a name of the individual, contact information of the individual (e.g., an e-mail address, a telephone number, a home address, etc.), and/or the like.

In this way, the campaign management platform identifies one or more individuals with campaign preferences that are compatible with the campaign parameters. By using the distributed ledger to identify individuals as targets for the campaign, the campaign management platform eliminates a need for a human to identify the individuals, which might otherwise require knowledge regarding data privacy and protection of personal information of individuals. This conserves resources (e.g., processing resources, network resources, and/or the like) that might otherwise be used to send data that violates data privacy laws and regulations, that might otherwise be used to educate a violator on data privacy laws and regulations, and/or the like.

As shown in FIG. 1C, and by reference number 116, the campaign management platform may generate the campaign information for the campaign. For example, the campaign management platform may generate the campaign information to include information identifying the one or more individuals to target for the campaign (e.g., which may include the personal information of the individual), information identifying particular campaign preferences of the identified individuals that were found to be compatible with the one or more campaign parameters, campaign instructions identifying specific actions that may be performed as part of the campaign, and/or the like. In this case, the campaign management platform may populate an electronic document with a list of individuals identified as targets for the campaign, with the particular campaign preferences of the individuals, and/or the like.

In some implementations, the campaign management platform may generate the campaign instructions identifying specific actions that may be performed as part of the campaign. For example, rather than simply provide a list of individuals and campaign preferences, the campaign management platform may generate campaign instructions that include specific actions that may be performed, such as when to provide a campaign offer to an individual, what mode of communication to use, and/or the like. In this way, the campaign management platform provides the device associated with the organization with specific actions that may be implemented to carry out the campaign. This reduces human intervention with the process, which may remove human error, subjectivity and/or waste from the process, and which may improve speed and efficiency of the process and conserve computing resources.

In some implementations, the campaign management platform may generate the campaign instructions using machine learning. For example, assume the campaign management platform has trained a data model on historical data using one or more machine learning techniques. The historical data may include historical campaign preferences of individuals, historical campaign information that includes historical campaign parameters and/or historical campaign offers, historical user interactions with campaigns (e.g., indicating whether an individual was responsive to a campaign offer, made a purchase based on the campaign offer, etc.), and/or the like. The data model may be trained to predict optimal actions to recommend as part of the campaign information.

In this case, the campaign management platform may provide the campaign parameters and/or the campaign preferences of the individuals identified for the campaign as input to the data model. This may cause the data model to output a set of values that may be used to predict optimal actions to recommend. For example, an individual may indicate in a campaign preference that a campaign offer may be provided to the individual only during an afternoon time period. Without the use of machine learning, the campaign manager might provide this individual with the campaign offer between 12:00 PM and 5:00 PM. However, the machine learning model may, either based on historical data of the individual, or historical data of individuals with similar attributes, identify that an optimal time to contact the individual is between 12:00 PM and 2:00 PM. This may be due to the fact that working individuals may be more likely to be receptive to the campaign offer if the campaign offer is received while on a lunch break.

As shown by reference number 118, the campaign management platform may provide the campaign information to the device associated with the organization. For example, the campaign management platform may provide the campaign information for display on an interface (e.g., a web interface, an application interface, and/or the like) of the device associated with the organization.

In some implementations, the campaign information provided may not include the personal information of the individuals identified as targets for the campaign. For example, the campaign information may include the encrypted identifiers of the individuals, and the device associated with the organization may have to reference the distributed file system using the encrypted identifiers to obtain the personal information of the individuals.

As shown by reference number 120, the device associated with the organization may use the campaign information for the campaign. For example, the employee of the organization (e.g., the campaign manager) may send campaign offers to the individuals identified by the campaign management platform. In this case, the employee may reference the campaign information to ensure that campaign preferences of individuals are not violated. For example, an individual may restrict time periods where the individual may be provided with marking offers, may restrict a mode of communication used to provide the market offers, and/or the like. As such, the employee may reference the campaign information to ensure that the campaign offers are provided at appropriate time periods, using appropriate modes of communication, and/or the like.

As shown by reference number 122, the campaign management platform may add a record to the distributed ledger. For example, the campaign management platform may create and add a record of a transaction between the campaign management platform and a smart contract. As a specific example, the campaign management platform may add a record of a transaction involving a smart contract that processed the campaign parameters to determine whether one or more campaign preferences of an individual were compatible with the campaign parameters.

Additionally, or alternatively, the campaign management platform may create and add a record of a change that is made to an individual's campaign preferences. For example, the blocks in the blockchain may be used for auditing purposes and may represent a verifiable history of transactions and modifications made to the smart contract of an individual. As a particular example, if an individual is to update a campaign preference, a field in the smart contract may be updated to reflect the updated campaign preference, and a block may be added to the blockchain indicating a time and date that the campaign preference was updated. As another example, if a new smart contract is created by the organization and made available to an individual, and the individual selects the new smart contract, the new smart contract may be used in place of the old smart contract. This may cause a block to be added to the blockchain indicating a time and date that the new smart contract was selected.

As shown by reference number 124, the campaign management platform may broadcast an update to the network of nodes. For example, the campaign management platform may broadcast an update to the network of nodes when a change is made to the distributed ledger. In this case, the update may include the record that is being added to the distributed ledger. As such, the other nodes, which may have access to independent copies of the blockchain, may modify the copies of the blockchain to account for the change (e.g., by adding a copy of the record that is being added to the copy of the blockchain). In this way, nodes may independently verify each record that is added to the distributed ledger, thereby improving security and providing failover protection (e.g., if the first node fails, another node may become the master node and may use the copy of the blockchain to perform one or more functions of the master node).

As shown by reference number 126, the auditing platform may audit the distributed ledger. For example, the auditing platform may audit the distributed ledger to verify that the organization is compliant with data privacy laws and regulations. In some implementations, the distributed ledger may store a record that includes proof that an individual submitted a particular campaign preference. For example, if an individual responded to an online survey, a device identifier of a user device of the individual's (e.g., a network address, an internet protocol (IP) address, etc.), along with the individual's specific response identifying the particular campaign preference, may be stored as a secure record within the distributed ledger. As another example, if an individual responded to a question via telephone, an oral response identifying the particular campaign preference may be stored using an audio file that is included as a record or as part of a record within the distributed ledger. In some cases, the proof that the individual submitted the particular campaign preference may be stored using the distributed file system. This may improve efficiency and use of the distributed ledger by reducing a time needed to perform a search (e.g., a query) on the distributed ledger.

In this way, the campaign management platform is able to use the distributed ledger and/or the distributed file system to manage campaign preferences for the group of individuals, and to reference the campaign preferences when generating campaign information for the campaign. Additionally, using the distributed ledger allows the campaign management platform to facilitate the distribution of the campaign preferences and/or the campaign information in a manner that is flexible, secure, distributed, and automated.

As indicated above, FIGS. 1A-1C are provided merely as an example. Other examples are possible and may differ from what was described with regard to FIGS. 1A-1C. For example, there may be additional devices and/or networks, fewer devices and/or networks, different devices and/or networks, or differently arranged devices and/or networks than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) of example implementation 100 may perform one or more functions described as being performed by another set of devices of example implementation 100.

Figure 2:
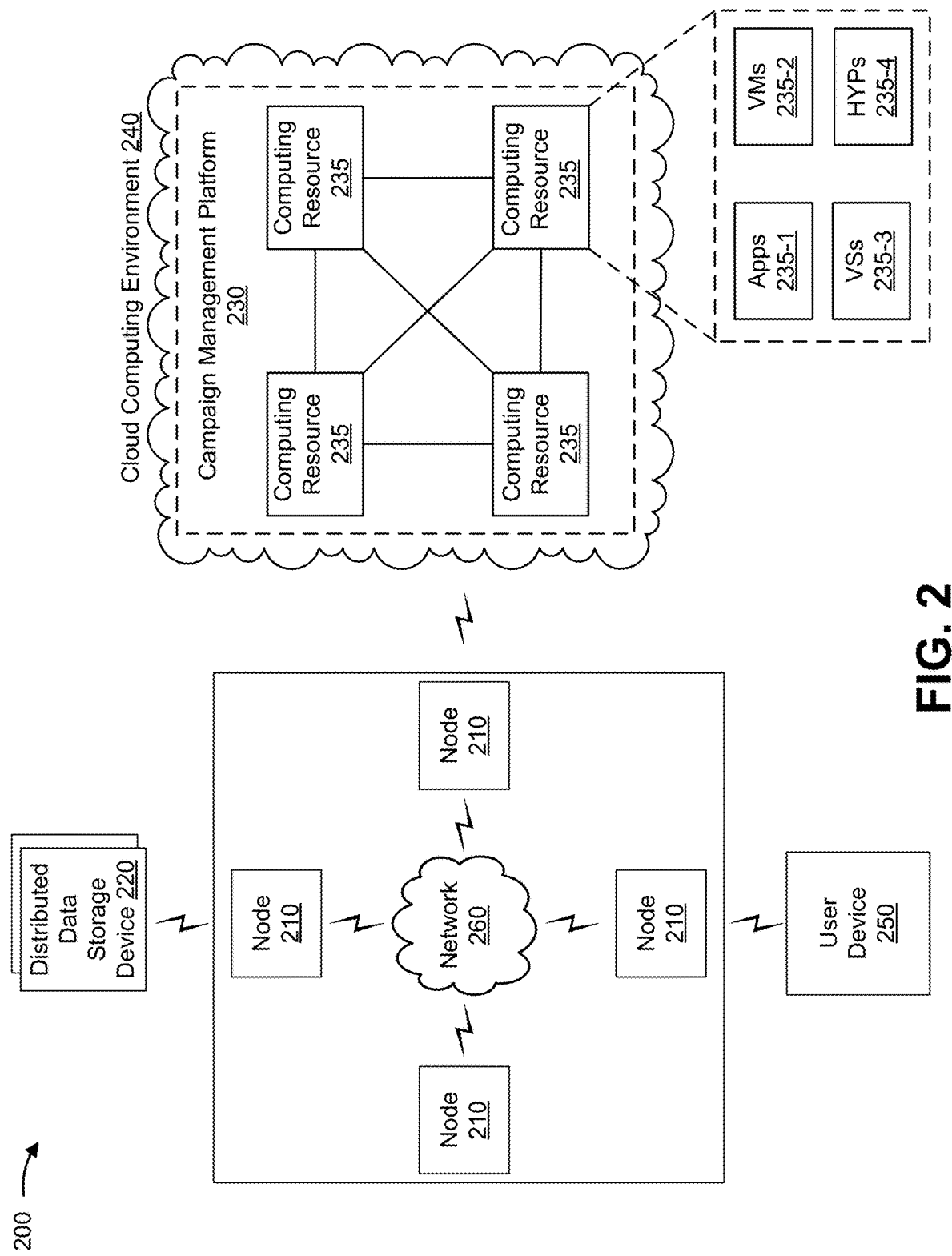
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a group of nodes 210, a group of distributed data storage devices 220, a campaign management platform hosted within a cloud computing environment 240, a user device 250, and/or a network 260. Devices of environment 200 may interconnect via wired connections, wireless connections, or a combination of wired and wireless connections.

Node 210 includes one or more devices capable of receiving, generating, storing, processing, and/or providing information associated with a campaign. For example, node 210 may include a computing device (e.g., a desktop computer, a laptop computer, a tablet computer, a handheld computer, a server device, etc.), a mobile phone (e.g., a smart phone, a radiotelephone, etc.), or a similar device.

In some implementations, a group of nodes 210 may be part of a network that is able to utilize a distributed ledger and/or a distributed file system to securely share campaign preferences and/or personal information of individuals. In some implementations, node 210 may be a device associated with an entity, such as an organization, a subsidiary of the organization, an individual, and/or the like. In some implementations, a group of nodes 210 may include nodes 210 that are associated with multiple organizations, multiple subsidiaries of an organization, multiple individuals, and/or the like.

Distributed data storage device 220 includes one or more devices capable of receiving, generating, storing, processing, and/or providing information associated with a group of individuals (e.g., campaign information, personal information, and/or the like). For example, distributed data storage device 220 may include a computing device, such as a server, a desktop computer, a laptop computer, a tablet computer, a handheld computer, or a similar device.

In some implementations, a first group of distributed data storage devices 220 may support a distributed ledger that uses a data structure (e.g., a blockchain) to store campaign information for a group of individuals. Additionally, or alternatively, a second group of distributed data storage devices 220 may support a distributed file system that is used to store personal information for a group of individuals that have provided campaign preferences to a distributed ledger (e.g., a blockchain). In some implementations, the second group of distributed data storage devices 220 may use the distributed file system to store encrypted identifiers for the group of individuals in association with the personal information of the group of individuals. While implementations described herein refer to a distributed file system, it is to be understood that one or more of the implementations may be implemented using a file system (e.g., that is not distributed).

Campaign management platform 230 includes one or more devices capable of receiving, generating, storing, processing, and/or providing information associated with a campaign. For example, campaign management platform 230 may include a server device (e.g., a host server, a web server, an application server, etc.), a data center device, or a similar device.

In some implementations, campaign management platform 230 may perform one or more actions described as being performed by node 210. In some implementations, campaign management platform 230 may serve as a master node or a management node for a group of nodes 210. In some implementations, campaign management platform 230 may be separate from the group of nodes 210 but may interact with the group of nodes 210. In some implementations, campaign management platform 230 may generate a smart contract for an individual or a group of individuals. In some implementations, campaign management platform 230 may interact with user device 250 to service a request for a list of targets for a campaign. In some implementations, campaign management platform 230 may search a distributed file system supported by distributed data storage device 220 to obtain personal information of an individual that has been identified as a target for a campaign.

In some implementations, as shown, campaign management platform 230 may be hosted in cloud computing environment 240. Notably, while implementations described herein describe campaign management platform 230 as being hosted in cloud computing environment 240, in some implementations, campaign management platform 230 may not be cloud-based (i.e., may be implemented outside of a cloud computing environment) or may be partially cloud-based.

Cloud computing environment 240 includes an environment that hosts campaign management platform 230. Cloud computing environment 240 may provide computation, software, data access, storage, etc. services that do not require end-user knowledge of a physical location and configuration of system(s) and/or device(s) that hosts campaign management platform 230. As shown, cloud computing environment 240 may include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 may host campaign management platform 230. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 may include one or more software applications that may be provided to or accessed by node 210 and/or distributed data storage device 220. Application 235-1 may eliminate a need to install and execute the software applications on these devices. For example, application 235-1 may include software associated with campaign management platform 230 and/or any other software capable of being provided via cloud computing environment 240. In some implementations, one application 235-1 may send/receive information to/from one or more other applications 235-1, via virtual machine 235-2.

Virtual machine 235-2 may include a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program and may support a single process. In some implementations, virtual machine 235-2 may execute on behalf of another device (e.g., node 210 and/or distributed data storage device 220), and may manage infrastructure of cloud computing environment 240, such as data management, synchronization, or long-duration data transfers.

Virtualized storage 235-3 may include one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 may provide hardware virtualization techniques that allow multiple operating systems (e.g., "guest operating systems") to execute concurrently on a host computer, such as computing resource 235. Hypervisor 235-4 may present a virtual operating platform to the guest operating systems and may manage the execution of the guest operating systems. Multiple instances of a variety of operating systems may share virtualized hardware resources.

User device 250 includes one or more devices capable of receiving, generating, storing, processing, and/or providing information associated with a campaign. For example, user device 250 may include a computing device (e.g., a desktop computer, a laptop computer, a tablet computer, a handheld computer, a server device, etc.), a mobile phone (e.g., a smart phone, a radiotelephone, etc.), or a similar device. In some implementations, a first user device 250 may be associated with a customer of an organization that is providing campaign preferences to campaign management platform 230. In some implementations, a second user device 250 may be associated with a campaign manager of the organization, and may interact with campaign management platform 230 to obtain campaign information for a campaign. In some implementations, user device 250 may be part of a group of nodes 210.

Network 260 includes one or more wired and/or wireless networks. For example, network 260 may include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
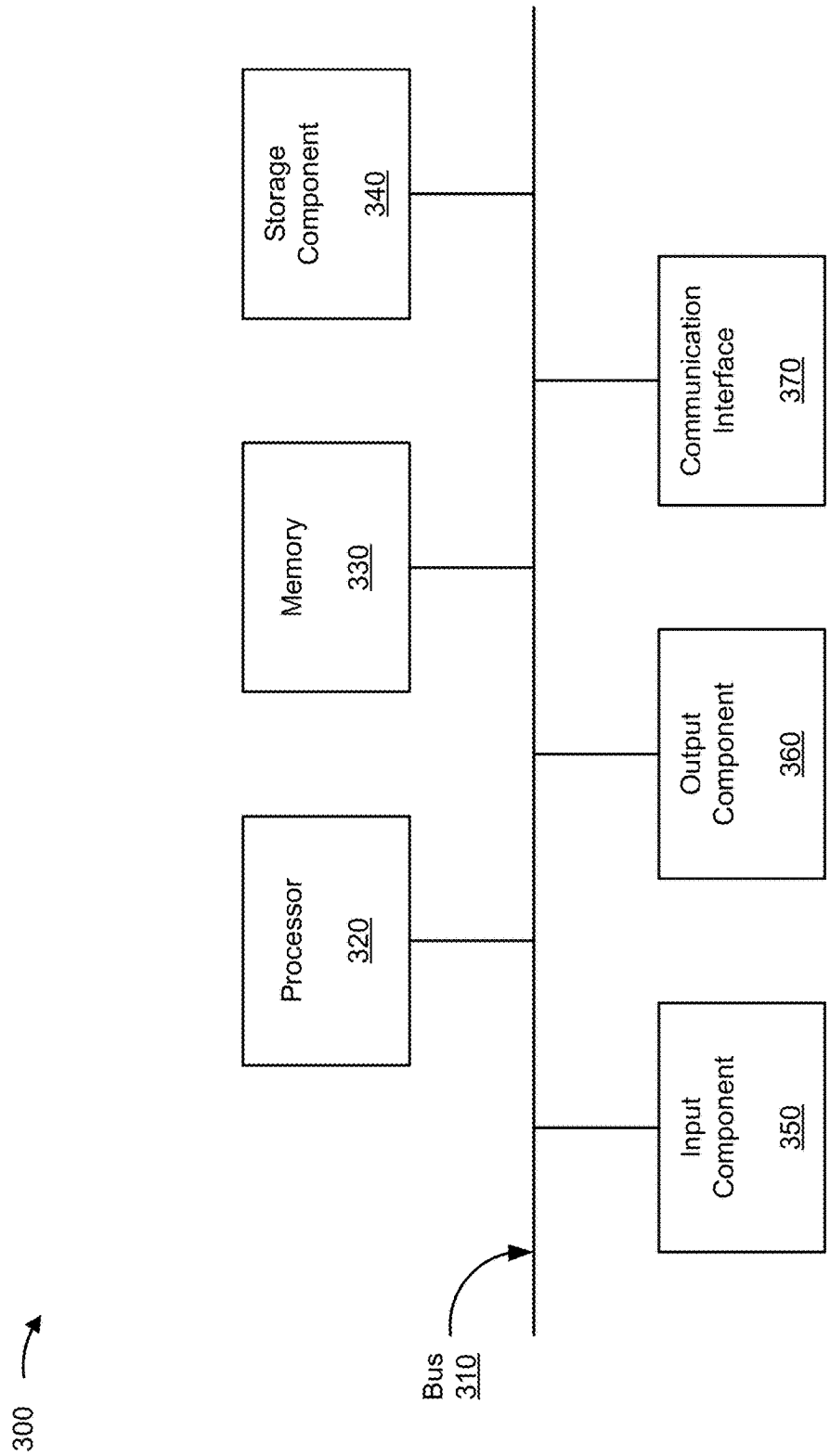
FIG. 3 is a diagram of example components of one or more devices of FIG. 2.

FIG. 3 is a diagram of example components of a device 300. Device 300 may correspond to node 210, distributed data storage device 220, campaign management platform 230, and/or user device 250. In some implementations, node 210, distributed data storage device 220, campaign management platform 230, and/or user device 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
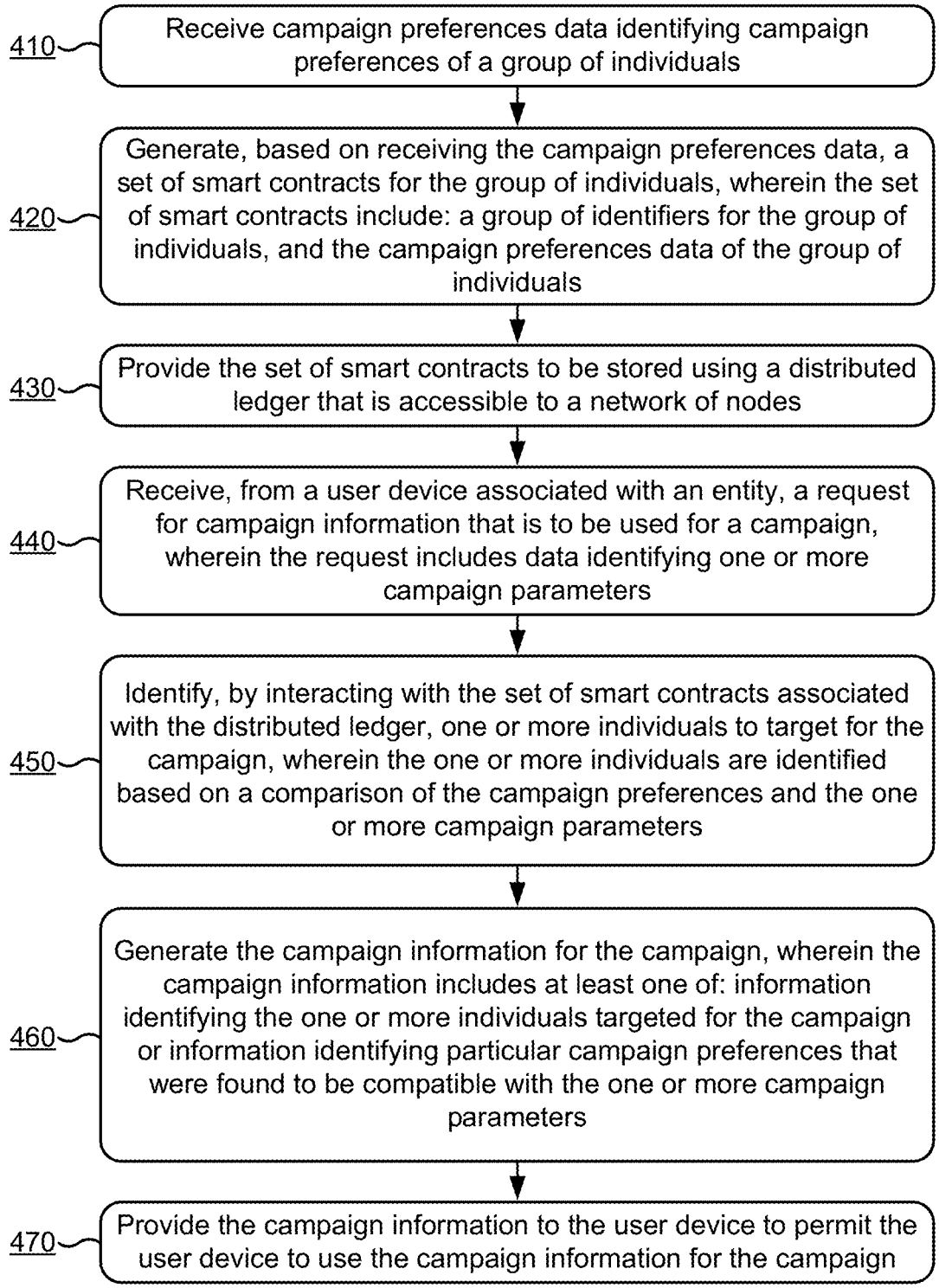
FIGS. 4-6 are flow charts of an example process for using a distributed ledger and/or a distributed file system to manage campaign preferences for a group of individuals, and for referencing the campaign preferences to generate campaign information identifying one or more individuals to target for a campaign.

FIG. 4 is a flow chart of an example process 400 for using a distributed ledger and/or a distributed file system to manage campaign preferences for a group of individuals, and for referencing the campaign preferences to generate campaign information identifying one or more individuals to target for a campaign. In some implementations, one or more process blocks of FIG. 4 may be performed by a campaign management platform (e.g., campaign management platform 230). In some implementations, one or more process blocks of FIG. 4 may be performed by another device or a group of devices separate from or including the campaign management platform, such as a node (e.g., node 210), a distributed data storage device (e.g., distributed data storage device 220), a user device (e.g., user device 250), and/or the like.

As shown in FIG. 4, process 400 may include receiving campaign preferences data identifying campaign preferences of a group of individuals (block 410). For example, the campaign management platform (e.g., using computing resource 235, processor 320, memory 330, storage component 340, input component 350, communication interface 370, and/or the like) may receive campaign preferences data identifying campaign preferences of a group of individuals, as described above in connection with FIGS. 1A-1C.

As further shown in FIG. 4, process 400 may include generating, based on receiving the campaign preferences data, a set of smart contracts for the group of individuals, wherein the set of smart contracts include a group of identifiers for the group of individuals, and the campaign preferences data of the group of individuals (block 420). For example, the campaign management platform (e.g., using computing resource 235, processor 320, memory 330, storage component 340, and/or the like) may generate, based on receiving the campaign preferences data, a set of smart contracts for the group of individuals, as described above in connection with FIGS. 1A-1C. In some implementations, the set of smart contracts may include a group of identifiers for the group of individuals and the campaign preferences data of the group of individuals.

As further shown in FIG. 4, process 400 may include providing the set of smart contracts to be stored using a distributed ledger that is accessible to a network of nodes (block 430). For example, the campaign management platform (e.g., using computing resource 235, processor 320, memory 330, storage component 340, output component 360, communication interface 370, and/or the like) may provide the set of smart contracts to be stored using a distributed ledger that is accessible to a network of nodes, as described above in connection with FIGS. 1A-1C.

As further shown in FIG. 4, process 400 may include receiving, from a user device associated with an entity, a request for campaign information that is to be used for a campaign, wherein the request includes data identifying one or more campaign parameters (block 440). For example, the campaign management platform (e.g., using computing resource 235, processor 320, memory 330, storage component 340, input component 350, communication interface 370, and/or the like) may receive, from a user device associated with an entity, a request for campaign information that is to be used for a campaign, as described above in connection with FIGS. 1A-1C. In some implementations, the request includes data identifying one or more campaign parameters.

As further shown in FIG. 4, process 400 may include identifying, by interacting with the set of smart contracts associated with the distributed ledger, one or more individuals to target for the campaign, the one or more individuals are identified based on a comparison of the campaign preferences and the one or more campaign parameters (block 450). For example, the campaign management platform (e.g., using computing resource 235, processor 320, memory 330, storage component 340, and/or the like) may identify, by interacting with the set of smart contracts associated with the distributed ledger, one or more individuals to target for the campaign, as described above in connection with FIGS. 1A-1C. In some implementations, the one or more individuals may be identified based on a comparison of the campaign preferences and the one or more campaign parameters.

As further shown in FIG. 4, process 400 may include generating the campaign information for the campaign, wherein the campaign information includes at least one of: information identifying the one or more individuals targeted for the campaign, or information identifying particular campaign preferences that were found to be compatible with the one or more campaign parameters (block 460). For example, the campaign management platform (e.g., using computing resource 235, processor 320, memory 330, storage component 340, and/or the like) may generate the campaign information for the campaign, as described above in connection with FIGS. 1A-1C. In some implementations, the campaign information may include at least one of: information identifying the one or more individuals targeted for the campaign, or information identifying particular campaign preferences that were found to be compatible with the one or more campaign parameters.

As further shown in FIG. 4, process 400 may include providing, to the user device, the campaign information to permit the user device to use the campaign information for the campaign (block 470). For example, the campaign management platform (e.g., using computing resource 235, processor 320, memory 330, storage component 340, output component 360, communication interface 370, and/or the like) may provide, to the user device, the campaign information to permit the user device to use the campaign information for the campaign, as described above in connection with FIGS. 1A-1C.

Process 400 may include additional implementations, such as any single implementation or any combination of implementations described below and/or described with regard to any other process described herein.

In some implementations, the distributed ledger may be a blockchain. In some implementations, the campaign preferences data may include data indicating which entities are permitted to target an individual for the campaign and/or data indicating a manner in which the entities are permitted to target the individual for the campaign. In some implementations, the set of smart contracts may be configured to receive the one or more campaign parameters as input and to output an indication of whether the campaign preferences are compatible with the one or more campaign parameters.

In some implementations, when generating the set of smart contracts, the campaign management platform may generate a smart contract, of the set of smart contracts, for an individual, of the group of individuals, using an identifier associated with the individual and the campaign preferences data of the individual. In some implementations, the campaign management platform may generate, by using a content addressing technique to process the identifier, a cryptographic hash value that serves as an encrypted identifier and that identifies a storage location at which personal information of the individual is to be stored using a distributed file system that is accessible to the network of nodes. In some implementations, when generating the set of smart contracts, the campaign management platform may provide, using the cryptographic hash value, the personal information of the individual to be stored at the storage location of the distributed file system. In some implementations, the campaign management platform may add the cryptographic hash value to the smart contract in place of the identifier of the individual. The cryptographic hash value may be capable of being used to reference the personal information of the individual.

In some implementations, a distributed file system that is accessible to the network of nodes may be used to store personal information for the group of individuals. The group of identifiers included in the set of smart contracts may be encrypted identifiers that identify storage locations for the personal information within the distributed file system. In some implementations, the campaign management platform may obtain the personal information for the one or more individuals by using one or more encrypted identifiers associated with the one or more individuals to search the distributed file system. In some implementations, when generating the campaign information, the campaign management platform may generate the campaign information to include the personal information of the one or more individuals. In some implementations, the network of nodes may include nodes that are associated with multiple entities.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
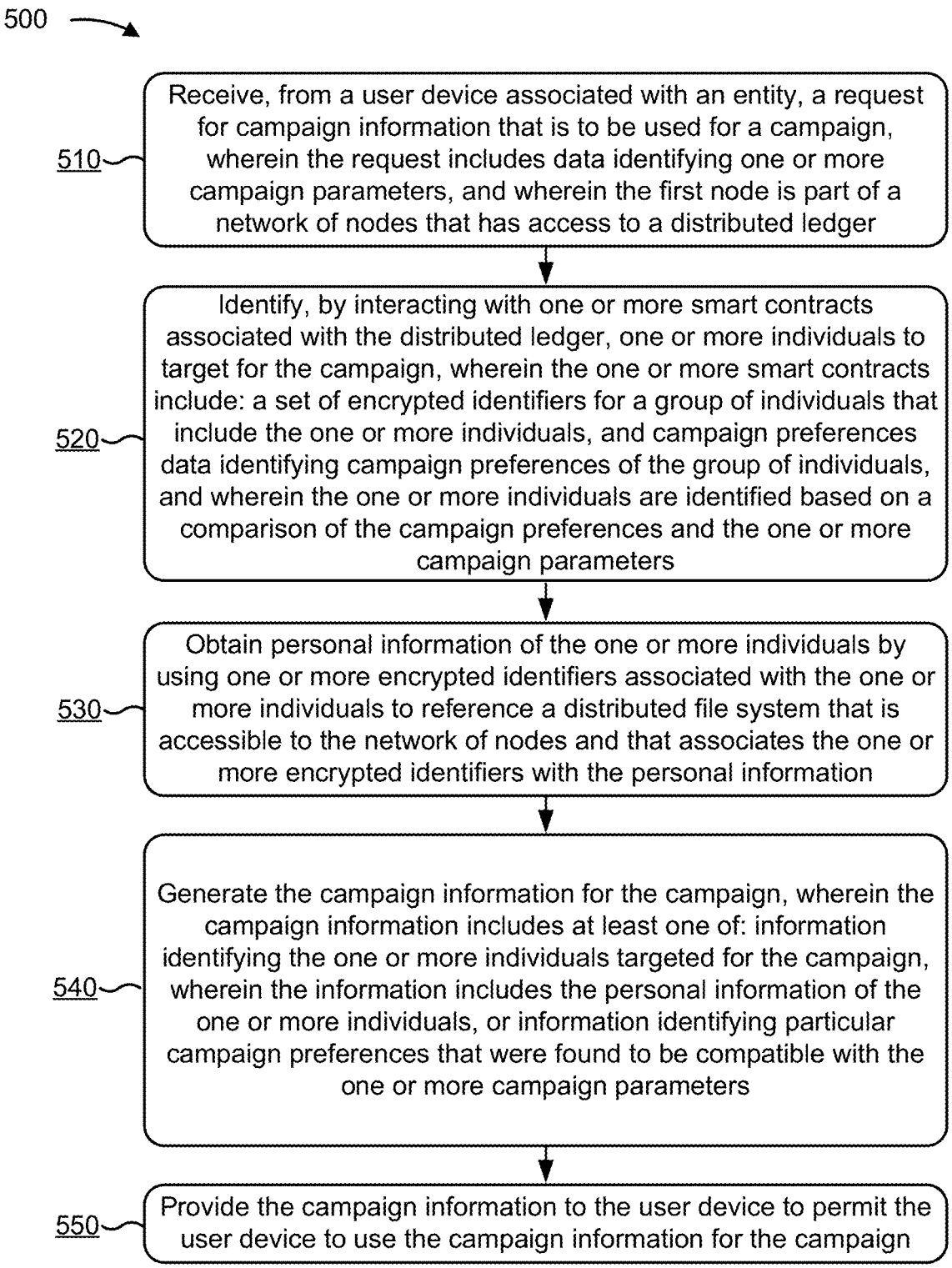

FIG. 5 is a flow chart of an example process 500 for using a distributed ledger and/or a distributed file system to manage campaign preferences for a group of individuals, and for referencing the campaign preferences to generate campaign information identifying one or more individuals to target for a campaign. In some implementations, one or more process blocks of FIG. 5 may be performed by a first node, such as a campaign management platform (e.g., campaign management platform 230, which may be a first node 210). In some implementations, one or more process blocks of FIG. 5 may be performed by another device or a group of devices separate from or including the campaign management platform, such as another node (e.g., a second node 210), a distributed data storage device (e.g., distributed data storage device 220), a user device (e.g., user device 250), and/or the like.

As shown in FIG. 5, process 500 may include receiving, from a user device associated with an entity, a request for campaign information that is to be used for a campaign, wherein the request includes data identifying one or more campaign parameters, and wherein the first node is part of a network of nodes that has access to a distributed ledger (block 510). For example, the campaign management platform (e.g., using computing resource 235, processor 320, memory 330, storage component 340, input component 350, communication interface 370, and/or the like) may receive, from a user device associated with an entity, a request for campaign information that is to be used for a campaign, as described above in connection with FIGS. 1A-1C. In some implementations, the request may include data identifying one or more campaign parameters, where the first node is part of a network of nodes that has access to a distributed ledger.

As further shown in FIG. 5, process 500 may include identifying, by interacting with one or more smart contracts associated with the distributed ledger, one or more individuals to target for the campaign, wherein the one or more smart contracts include: a set of encrypted identifiers for a group of individuals that include the one or more individuals, and campaign preferences data identifying campaign preferences of the group of individuals, and wherein the one or more individuals are identified based on a comparison of the campaign preferences and the one or more campaign parameters (block 520). For example, the campaign management platform (e.g., using computing resource 235, processor 320, memory 330, storage component 340, and/or the like) may identify, by interacting with one or more smart contracts associated with the distributed ledger, one or more individuals to target for the campaign, as described above in connection with FIGS. 1A-1C. In some implementations, the one or more smart contracts may include a set of encrypted identifiers for a group of individuals that include the one or more individuals and campaign preferences data identifying campaign preferences of the group of individuals. In some implementations, the one or more individuals may be identified based on a comparison of the campaign preferences and the one or more campaign parameters.

As further shown in FIG. 5, process 500 may include obtaining personal information of the one or more individuals by using one or more encrypted identifiers associated with the one or more individuals to reference a distributed file system that is accessible to the network of nodes and that associates the one or more encrypted identifiers with the personal information (block 530). For example, the campaign management platform (e.g., using computing resource 235, processor 320, memory 330, storage component 340, input component 350, communication interface 370, and/or the like) may obtain personal information of the one or more individuals by using one or more encrypted identifiers associated with the one or more individuals to reference a distributed file system that is accessible to the network of nodes and that associates the one or more encrypted identifiers with the personal information, as described above in connection with FIGS. 1A-1C.

As further shown in FIG. 5, process 500 may include generating the campaign information for the campaign, wherein the campaign information includes at least one of: information identifying the one or more individuals targeted for the campaign, wherein the information includes the personal information of the one or more individuals, or information identifying particular campaign preferences that were found to be compatible with the one or more campaign parameters (block 540). For example, the campaign management platform (e.g., using computing resource 235, processor 320, memory 330, storage component 340, and/or the like) may generate the campaign information for the campaign, as described above in connection with FIGS. 1A-1C. In some implementations, the campaign information may include at least one of: information identifying the one or more individuals targeted for the campaign, wherein the information includes the personal information of the one or more individuals, and information identifying particular campaign preferences that were found to be compatible with the one or more campaign parameters.

As further shown in FIG. 5, process 500 may include providing the campaign information to the user device to permit the user device to use the campaign information to target the one or more individuals for the campaign (block 550). For example, the campaign management platform (e.g., using computing resource 235, processor 320, memory 330, storage component 340, output component 360, communication interface 370, and/or the like) may provide the campaign information to the user device to permit the user device to use the campaign information to target the one or more individuals for the campaign, as described above in connection with FIGS. 1A-1C.

Process 500 may include additional implementations, such as any single implementation or any combination of implementations described below and/or described with regard to any other process described herein.

In some implementations, the campaign management platform may receive, before receiving the request for the campaign information, campaign preferences data for the group of individuals. In some implementations, the campaign management platform may generate, based on receiving the campaign preferences data, the one or more smart contracts for the group of individuals, and may provide the one or more smart contracts to the distributed ledger.

In some implementations, when identifying the one or more individuals to target for the campaign, the campaign management platform may provide, as input to the one or more smart contracts, the one or more campaign parameters to cause the one or more smart contracts to output values indicating whether the campaign preferences are compatible with the one or more campaign parameters. In some implementations, the campaign management platform may determine that the threshold number of campaign preferences of the one or more individuals is compatible with the one or more campaign parameters. In some implementations, the campaign management platform may identify the one or more individuals based on determining that the threshold number of campaign preferences of the one or more individuals is compatible with the one or more campaign parameters.

In some implementations, the campaign preferences data may include at least one of: data indicating which entities are permitted to target an individual for the campaign or data indicating a manner in which the entities are permitted to target the individual for the campaign. In some implementations, the network of nodes may include nodes that are associated with multiple entities. In some implementations, a number of smart contracts, in the one or more smart contracts, may correspond to a number of individuals in the group of individuals.

In some implementations, when generating the campaign information, the campaign management platform may generate the information identifying the one or more individuals targeted for the campaign and may generate the information identifying the particular campaign preferences that were found to be compatible with the one or more campaign parameters.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
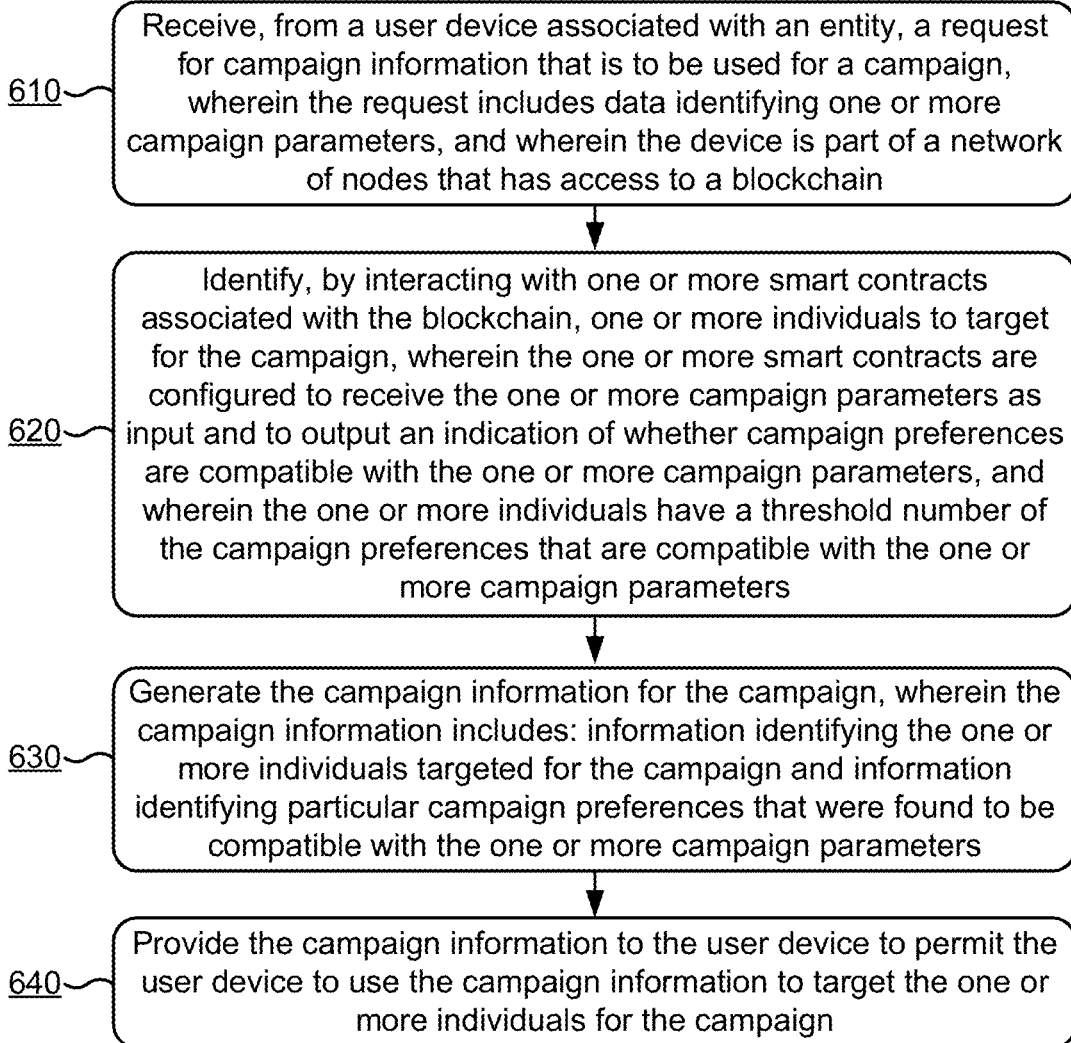

FIG. 6 is a flow chart of an example process 600 for using a distributed ledger and/or a distributed file system to manage campaign preferences for a group of individuals, and for referencing the campaign preferences to generate campaign information identifying one or more individuals to target for a campaign. In some implementations, one or more process blocks of FIG. 6 may be performed by a campaign management platform (e.g., campaign management platform 230). In some implementations, one or more process blocks of FIG. 6 may be performed by another device or a group of devices separate from or including the campaign management platform, such as a node (e.g., node 210), a distributed data storage device (e.g., distributed data storage device 220), a user device (e.g., user device 250), and/or the like.

As shown in FIG. 6, process 600 may include receiving, from a user device associated with an entity, a request for campaign information that is to be used for a campaign, wherein the request includes data identifying one or more campaign parameters, and wherein the device is part of a network of nodes that has access to a blockchain (block 610). For example, the campaign management platform (e.g., using computing resource 235, processor 320, memory 330, storage component 340, input component 350, communication interface 370, and/or the like) may receive, from a user device associated with an entity, a request for campaign information that is to be used for a campaign, as described above in connection with FIGS. 1A-1C. In some implementations, the request may include data identifying one or more campaign parameters. In some implementations, the device may be part of a network of nodes that has access to a blockchain.

As further shown in FIG. 6, process 600 may include identifying, by interacting with one or more smart contracts associated with the blockchain, one or more individuals to target for the campaign, wherein the one or more smart contracts are configured to receive the one or more campaign parameters as input and to output an indication of whether campaign preferences are compatible with the one or more campaign parameters, and wherein the one or more individuals have a threshold number of the campaign preferences that are compatible with the one or more campaign parameters (block 620). For example, the campaign management platform (e.g., using computing resource 235, processor 320, memory 330, storage component 340, and/or the like) may identify, by interacting with one or more smart contracts associated with the blockchain, one or more individuals to target for the campaign, as described above in connection with FIGS. 1A-1C. In some implementations, the one or more smart contracts may be configured to receive the one or more campaign parameters as input and to output an indication of whether campaign preferences are compatible with the one or more campaign parameters. In some implementations, the one or more individuals may have a threshold number of the campaign preferences that are compatible with the one or more campaign parameters.

As further shown in FIG. 6, process 600 may include generating the campaign information for the campaign, wherein the campaign information includes information identifying the one or more individuals targeted for the campaign and information identifying particular campaign preferences that were found to be compatible with the one or more campaign parameters (block 630). For example, the campaign management platform (e.g., using computing resource 235, processor 320, memory 330, storage component 340, and/or the like) may generate the campaign information for the campaign, as described above in connection with FIGS. 1A-1C. In some implementations, the campaign information may include information identifying the one or more individuals targeted for the campaign and information identifying particular campaign preferences that were found to be compatible with the one or more campaign parameters.

As further shown in FIG. 6, process 600 may include providing the campaign information to the user device to permit the user device to use the campaign information to target the one or more individuals for the campaign (block 640). For example, the campaign management platform (e.g., using computing resource 235, processor 320, memory 330, storage component 340, output component 360, communication interface 370, and/or the like) may provide the campaign information to the user device to permit the user device to use the campaign information to target the one or more individuals for the campaign, as described above in connection with FIGS. 1A-1C.

Process 600 may include additional implementations, such as any single implementation or any combination of implementations described below and/or described with regard to any other process described herein.

In some implementations, the campaign preferences data may include data indicating which entities are permitted to target an individual for the campaign, and data indicating a manner in which the entities are permitted to target the individual for the campaign. In some implementations, the information identifying the particular campaign preferences includes at least one of: information identifying one or more modes of communication which are permitted to be used when targeting the one or more individuals, or information identifying one or more times at which the one or more individuals are permitted to be targeted.

In some implementations, the campaign management platform may receive, before receiving the request for the campaign information, campaign preferences data identifying the campaign preferences for a group of individuals. In some implementations the campaign management platform may generate, based on receiving the campaign preferences data, the one or more smart contracts for the group of individuals. The one or more smart contracts may include a group of identifiers for the group of individuals and the campaign preferences data of the group of individuals. In some implementations, the campaign management platform may provide the one or more smart contracts to the blockchain.

In some implementations, when generating the one or more smart contracts, the campaign management platform may generate a smart contract, of the one or more smart contracts, for an individual, of the group of individuals, using an identifier associated with the individual and the campaign preferences data of the individual. In some implementations, the campaign management platform may generate, by using a content addressing technique to process the identifier, a cryptographic hash value that serves as an encrypted identifier and that identifies a storage location at which personal information of the individual is to be stored using a distributed file system that is accessible to the network of nodes. In some implementations, the campaign management platform may provide, using the cryptographic hash value, the personal information of the individual to be stored at the storage location of the distributed file system. In some implementations, the campaign management platform may add the cryptographic hash value to the smart contract in place of the identifier of the individual. The cryptographic hash value may be capable of being used to reference the personal information of the individual.

In some implementations, a distributed file system that is accessible to the network of nodes may be used to store personal information for a group of individuals. The one or more smart contracts may include a group of encrypted identifiers that identify storage locations for the personal information of the group of individuals within the distributed file system. In some implementations, the campaign management platform may obtain, after identifying the one or more individuals, the personal information for the one or more individuals by using one or more encrypted identifiers associated with the one or more individuals to search the distributed file system. In some implementations, when generating the campaign information, the campaign management platform may generate the campaign information to include the personal information of the one or more individuals.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device associated with a network of devices, campaign selections data identifying campaign selections of a group of individuals,
      the group of individuals being customers of a particular entity, and
      the campaign selections including one or more of:
         a first campaign selection indicating whether an individual of the group of individuals consents to be targeted for a campaign by the particular entity,
         a second campaign selection indicating a mode of communication by which the individual agrees to receive offers that are part of the campaign by the particular entity,
         a third campaign selection indicating one or more time periods during which the individual agrees to receive offers that are part of the campaign by the particular entity, or
         a fourth campaign selection indicating what type of content the individual agrees to receive by the particular entity;
   generating, by the device and based on receiving the campaign selections data, a set of smart contracts for the group of individuals,
      wherein the set of smart contracts include:
         a group of identifiers associated with the group of individuals, and
         the campaign selections data associated with the group of individuals,
         a first smart contract for a first account associated with the individual, and
         a second smart contract for a second account associated with the individual;
   providing, by the device, the set of smart contracts to be stored using a distributed ledger that is accessible to the network of devices,
      wherein the distributed ledger is associated with a blockchain, and
      wherein the set of smart contracts are stored as part of the blockchain;
   receiving, by the device and from a user device associated with the particular entity, a request for campaign information that is to be used for the campaign,
      wherein the request includes data identifying one or more campaign parameters associated with the campaign;
   providing, by the device and as input to the one or more smart contracts, the one or more campaign parameters to cause the one or more smart contracts to output values indicating whether the campaign selections are compatible with the one or more campaign parameters;
   determining, by the device, that a threshold quantity of campaign selections is compatible with the one or more campaign parameters;
   generating, by the device, using the set of smart contracts, the campaign information based on determining that the threshold quantity of campaign selections is compatible with the one or more campaign parameters,
      wherein the campaign information is generated based on a comparison of the campaign selections and the one or more campaign parameters, and
      wherein the campaign information includes at least one of:
         information identifying the group of individuals targeted for the campaign,
            the group of individuals targeted for the campaign being associated with the group of identifiers, or
         information identifying one or more of the campaign selections that were found to be compatible with the one or more campaign parameters based on the comparison;
   receiving, by the device, audit information associated with the distributed ledger verifying that the particular entity is compliant with data privacy laws and regulations associated with a user's private data;
   storing, by the device, the audit information associated with the distributed ledger,
      the audit information to include a secure record associated with an individual's specific response identifying a particular campaign preference; and providing, by the device and to the user device, access to the campaign information for use with the campaign.

2. The method of claim 1, wherein the campaign selections data includes at least one of:
   first data indicating which entities are permitted to target the individual for the campaign, or
   second data indicating a manner in which the entities are permitted to target the individual for the campaign.

3. The method of claim 1, wherein generating the set of smart contracts comprises:
   generating a smart contract, of the set of smart contracts, for the individual using an identifier associated with the individual and the campaign selections data of the individual,
   generating, by using a content addressing technique to process the identifier, a cryptographic hash value that serves as an encrypted identifier and that identifies a storage location at which personal information of the individual is to be stored using a distributed file system that is accessible to the network of devices,
   providing, using the cryptographic hash value, the personal information of the individual to be stored at the storage location of the distributed file system, and
   adding the cryptographic hash value to the smart contract in place of the identifier of the individual,
   wherein the cryptographic hash value is capable of being used to reference the personal information of the individual.

4. The method of claim 1, wherein a distributed file system that is accessible to the network of devices is used to store personal information for the group of individuals,
   wherein the group of identifiers included in the set of smart contracts are encrypted identifiers that identify storage locations for the personal information within the distributed file system; and
   wherein the method further comprises:
      obtaining the personal information for the group of individuals by using one or more encrypted identifiers associated with the group of individuals to search the distributed file system; and
      wherein generating the campaign information comprises:
         generating the campaign information to include the personal information of the group of individuals.

5. The method of claim 1, wherein the network of devices includes devices that are associated with multiple entities.

6. A first device, comprising:
   one or more memories; and
   one or more processors, operatively coupled to the one or more memories, to:
      receive, from a user device associated with a particular entity, a request for campaign information that is to be used for a campaign,
         wherein the request includes data identifying one or more campaign parameters associated with the campaign,
         wherein the first device is part of a network of devices that has access to a distributed ledger, and
         wherein the distributed ledger is associated with a blockchain;
      generate, using the one or more smart contracts, the campaign information,
         wherein the one or more smart contracts include:
            a set of encrypted identifiers associated with a group of individuals,
               the group of individuals being customers of the particular entity, and
            campaign selections data identifying campaign selections of the group of individuals,
               the campaign selections including one or more of:
                  a first campaign selection indicating whether an individual of the group of individuals consents to be targeted for a campaign by the particular entity,
                  a second campaign selection indicating a mode of communication by which the individual agrees to receive offers that are part of the campaign by the particular entity,
                  a third campaign selection indicating one or more time periods during which the individual agrees to receive offers that are part of the campaign by the particular entity, or
                  a fourth campaign selection indicating what type of content the individual agrees to receive by the particular entity, and
               a respective smart contract for each account of an individual for which the campaign selections have been received,
         wherein the campaign information is generated based on a comparison of the campaign selections and the one or more campaign parameters,
         wherein the one or more smart contracts are stored as part of the blockchain,
         wherein the one or more campaign parameters are provided as input to cause the one or more smart contracts to output values indicating whether the campaign selections are compatible with the one or more campaign parameters,
         wherein a threshold quantity of the campaign selections are determined to be compatible with the one or more campaign parameters, and
         wherein the campaign information is generated based on determining that the threshold quantity of campaign selections is compatible with the one or more campaign parameters;
      obtain personal information associated with the group of individuals by using one or more encrypted identifiers associated with the group of individuals to reference a distributed file system that is accessible to the network of devices and that associates the one or more encrypted identifiers with the personal information; generate the campaign information for the campaign,
         wherein the campaign information includes at least one of:
            information identifying the group of individuals targeted for the campaign,
               wherein the information identifying the group of individuals includes the personal information of the group of individuals, or
            information identifying the campaign selections that were found to be compatible with the one or more campaign parameters based on the comparison;
      receive audit information associated with the distributed ledger verifying that the particular entity is compliant with data privacy laws and regulations;
      store the audit information associated with the distributed ledger,
         the audit information to include a secure record associated with an individual's specific response identifying a particular campaign preference; and provide access to the campaign information to the user device for use with the campaign.

7. The first device of claim 6, wherein the one or more processors are further to:
  receive, before receiving the request for the campaign information, the campaign selections data for the group of individuals;
  generate, based on receiving the campaign selections data, the one or more smart contracts for the group of individuals; and
  provide the one or more smart contracts to the distributed ledger.

8. The first device of claim 6, wherein the campaign selections data includes at least one of:
  first data indicating which entities are permitted to target the individual for the campaign, or
  second data indicating a manner in which the entities are permitted to target the individual for the campaign.

9. The first device of claim 6, wherein the network of devices includes devices that are associated with multiple entities.

10. The first device of claim 6, wherein a quantity of smart contracts, in the one or more smart contracts, corresponds to a quantity of individuals in the group of individuals.

11. The first device of claim 6, wherein the one or more processors, when generating the campaign information, are to:
  generate the information identifying the group of individuals targeted for the campaign, and
  generate the information identifying the campaign selections that were found to be compatible with the one or more campaign parameters.

12. A non-transitory computer-readable medium storing one or more instructions, the one or more instructions comprising:
  one or more instructions that, when executed by one or more processors of a device, cause the one or more processors to:
    receive, from a user device associated with a particular entity, a request for campaign information that is to be used for a campaign,
      wherein the request includes data identifying one or more campaign parameters associated with the campaign, and
      wherein the device is part of a network of devices that has access to a blockchain;
    generate, using one or more smart contracts associated with the blockchain, the campaign information,
      wherein the one or more smart contracts is stored using a distributed ledger that is accessible to the network of devices,
        wherein the distributed ledger is associated with the blockchain,
      wherein the one or more smart contracts are stored as part of the blockchain,
      wherein the campaign information is generated based on a comparison of the one or more campaign parameters as input and to output an indication of whether campaign selections are compatible with the one or more campaign parameters, the campaign selections including one or more of:
        a first campaign selection indicating whether an individual of a group of individuals consents to be targeted for the campaign by the particular entity,
          the group of individuals being customers of the particular entity,
        a second campaign selection indicating a mode of communication by which the individual agrees to receive offers that are part of the campaign by the particular entity,
        a third campaign selection indicating one or more time periods during which the individual agrees to receive offers that are part of the campaign by the particular entity, or
        a fourth campaign selection indicating what type of content the individual agrees to receive by the particular entity, and
      wherein the campaign information includes a threshold quantity of the campaign selections that are compatible with the one or more campaign parameters; and
      wherein the one or more smart contracts includes a respective smart contract for each account of an individual for which the campaign selections have been received;
    provide, as input to the one or more smart contracts, the one or more campaign parameters to cause the one or more smart contracts to output values indicating whether the campaign selections are compatible with the one or more campaign parameters;
    determine that a threshold quantity of campaign selections is compatible with the one or more campaign parameters;
    generate the campaign information for the campaign based on determining that the threshold quantity of campaign selections is compatible with the one or more campaign parameters,
      wherein the campaign information includes:
        information identifying the group of individuals targeted for the campaign,
          the group of individuals targeted for the campaign being associated with a group of identifiers, and
        information identifying one or more of the campaign selections that were found to be compatible with the one or more campaign parameters based on the comparison;
    receive audit information associated with the distributed ledger verifying that the particular entity is compliant with data privacy laws and regulations;
    store the audit information associated with the distributed ledger,
      the audit information to include a secure record associated with an individual's specific response identifying a particular campaign preference; and
    provide access to the campaign information to the user device for use with the campaign.

13. The non-transitory computer-readable medium of claim 12, wherein campaign selections data for the campaign selections includes:
  first data indicating which entities are permitted to target the individual for the campaign, and
  second data indicating a manner in which the entities are permitted to target the individual for the campaign.

14. The non-transitory computer-readable medium of claim 12, wherein the one or more instructions, when executed by the one or more processors, further cause the one or more processors to:
  receive, before receiving the request associated with the campaign information, campaign selections data identifying the campaign selections for the group of individuals;

generate, based on receiving the campaign selections data, the one or more smart contracts for the group of individuals,
  wherein the one or more smart contracts include:
    the group of identifiers for the group of individuals, and
    the campaign selections data of the group of individuals; and
provide the one or more smart contracts to the blockchain.

15. The non-transitory computer-readable medium of claim 14, wherein the one or more instructions, that cause the one or more processors to generate the one or more smart contracts, cause the one or more processors to:
  generate a smart contract, of the one or more smart contracts, for the individual, of the group of individuals, using an identifier associated with the individual and the campaign selections data of the individual,
  generate, by using a content addressing technique to process the identifier, a cryptographic hash value that serves as an encrypted identifier and that identifies a storage location at which personal information of the individual is to be stored using a distributed file system that is accessible to the network of devices,
  provide, using the cryptographic hash value, the personal information of the individual to be stored at the storage location of the distributed file system, and
  add the cryptographic hash value to the smart contract in place of the identifier of the individual,
    wherein the cryptographic hash value is capable of being used to reference the personal information of the individual.

16. The non-transitory computer-readable medium of claim 12, wherein a distributed file system that is accessible to the network of devices is used to store personal information for the group of individuals, wherein the one or more smart contracts include a group of encrypted identifiers that identify storage locations for the personal information of the group of individuals within the distributed file system; and
  wherein the one or more instructions, when executed by the one or more processors, further cause the one or more processors to:
    obtain, after identifying the group of individuals, the personal information for the group of individuals by using one or more encrypted identifiers associated with the group of individuals to search the distributed file system; and
  wherein the one or more instructions, that cause the one or more processors to generate the campaign information, cause the one or more processors to:
    generate the campaign information to include the personal information of the group of individuals.

17. The method of claim 1, further comprising:
  validating the set of smart contracts based on one or more rules or protocols used within the distributed ledger.

18. The non-transitory computer-readable medium of claim 12, wherein the one or more instructions, when executed by the one or more processors, further cause the one or more processors to:
  validate the one or more smart contracts based on one or more rules or protocols used within the distributed ledger.

19. The non-transitory computer-readable medium of claim 12, wherein the network of devices includes devices that are associated with multiple entities.

20. The first device of claim 6, wherein the one or more processors are further to:
  validate the one or more smart contracts based on one or more rules or protocols used within the distributed ledger.

* * * * *